10

United States Patent
Einarsson et al.

(10) Patent No.: US 11,546,306 B2
(45) Date of Patent: *Jan. 3, 2023

(54) EFFICIENT COMMON STORAGE OF PARTIALLY ENCRYPTED CONTENT

(71) Applicant: TIVO CORPORATION, San Jose, CA (US)

(72) Inventors: Torbjörn Einarsson, Stockholm (SE); Fritz Barnes, Alameda, CA (US)

(73) Assignee: TiVo Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/211,106

(22) Filed: Dec. 5, 2018

(65) Prior Publication Data
US 2019/0116163 A1 Apr. 18, 2019

Related U.S. Application Data

(63) Continuation of application No. 13/953,482, filed on Jul. 29, 2013, now Pat. No. 10,182,038.

(51) Int. Cl.
*H04L 9/40* (2022.01)
*H04L 9/06* (2006.01)
(Continued)

(52) U.S. Cl.
CPC .......... *H04L 63/0428* (2013.01); *G06F 21/10* (2013.01); *H04L 9/065* (2013.01);
(Continued)

(58) Field of Classification Search
CPC ....... G06F 21/10; H04L 63/0428; H04L 9/18; H04L 9/065; H04N 21/23476
See application file for complete search history.

(56) References Cited

U.S. PATENT DOCUMENTS 7,165,050 B2   1/2007  Marking
7,320,069 B1   1/2008  Sundharraj et al.
(Continued)

FOREIGN PATENT DOCUMENTS

WO   2015017197 A2   2/2015

OTHER PUBLICATIONS

D. Posch, H. Hellwagner and P. Schartner, "On-demand video streaming based on dynamic adaptive encrypted content chunks," 2013 21st IEEE International Conference on Network Protocols (ICNP), 2013, pp. 1-6. (Year: 2013).*

(Continued)

*Primary Examiner* — Kari L Schmidt
(74) *Attorney, Agent, or Firm* — Haley Guiliano LLP

(57) ABSTRACT

Techniques and mechanisms described herein facilitate the efficient common storage of partially encrypted content. According to various embodiments, a client device to transmit a designated representation of a media content item via a communications interface may be received. The media content item may be associated with a plurality of representations including the designated representation. The media content item may be associated with first media content data and second media content data. The first media content data may be shared among the plurality of representations. The second media content data may be specific to the designated representation. The first media content data may be combined with the second media content data to create a designated partially encrypted media content portion associated with the designated representation via a processor. The designated partially encrypted media content portion may be transmitted to the client device via the communications interface.

20 Claims, 7 Drawing Sheets

(51) Int. Cl.
  *G06F 21/10* (2013.01)
  *H04L 65/80* (2022.01)
  *H04L 67/02* (2022.01)
  *H04N 21/2347* (2011.01)
  *H04L 65/65* (2022.01)
  *H04L 65/612* (2022.01)

(52) U.S. Cl.
  CPC ............ *H04L 65/612* (2022.05); *H04L 65/65* (2022.05); *H04L 65/80* (2013.01); *H04L 67/02* (2013.01); *H04N 21/23476* (2013.01)

(56) References Cited

U.S. PATENT DOCUMENTS

| | | | |
|---|---|---|---|
| 8,370,452 B2* | 2/2013 | Harvell | G06F 16/9574 709/217 |
| 8,401,188 B1 | 3/2013 | Swaminathan et al. | |
| 8,929,540 B2 | 1/2015 | Takashima | |
| 9,003,558 B1 | 4/2015 | Dorwin et al. | |
| 9,143,812 B2 | 9/2015 | Braness et al. | |
| 10,028,010 B2* | 7/2018 | Pendakur | G06F 21/10 |
| 2002/0054134 A1 | 5/2002 | Kelts | |
| 2003/0097443 A1 | 5/2003 | Gillett et al. | |
| 2004/0003101 A1* | 1/2004 | Roth | H04L 65/605 709/231 |
| 2004/0028227 A1 | 2/2004 | Yu | |
| 2005/0207569 A1 | 9/2005 | Zhang et al. | |
| 2006/0291803 A1* | 12/2006 | Watson | H04N 7/17336 386/E5.067 |
| 2007/0083467 A1 | 4/2007 | Lindahl et al. | |
| 2007/0192789 A1* | 8/2007 | Medford | H04N 21/8455 725/135 |
| 2008/0034205 A1* | 2/2008 | Alain | G06F 21/6209 713/160 |
| 2009/0225983 A1 | 9/2009 | Reinoso et al. | |
| 2011/0075842 A1* | 3/2011 | Le Barz | H04N 21/8456 380/212 |
| 2011/0302319 A1 | 12/2011 | Ha et al. | |
| 2012/0265892 A1 | 10/2012 | Ma et al. | |
| 2012/0284370 A1 | 11/2012 | Hierro | |
| 2012/0284804 A1 | 11/2012 | Lindquist et al. | |
| 2012/0317605 A1 | 12/2012 | Brogan | |
| 2013/0054728 A1* | 2/2013 | Amir | H04N 21/8455 709/213 |
| 2013/0132986 A1 | 5/2013 | Mack et al. | |
| 2013/0179546 A1 | 7/2013 | Seol et al. | |
| 2013/0195204 A1 | 8/2013 | Reznik et al. | |
| 2013/0290697 A1 | 10/2013 | Wang et al. | |
| 2014/0101445 A1 | 4/2014 | Giladi | |
| 2014/0161196 A1 | 6/2014 | Culebro et al. | |
| 2014/0280781 A1* | 9/2014 | Gregotski | H04L 65/60 709/219 |
| 2014/0281481 A1* | 9/2014 | Moroney | H04L 63/0457 713/151 |
| 2015/0033008 A1 | 1/2015 | Einarsson et al. | |
| 2022/0030308 A1* | 1/2022 | Bentaleb | H04L 47/24 |

OTHER PUBLICATIONS

Xiao, Zhen, and Fan Ye. "New insights on internet streaming and IPTV." Proceedings of the 2008 international conference on Content-based image and video retrieval. 2008, pp. 645-654. (Year: 2008).*
"U.S. Appl. No. 13/953,482, Examiner Interview Summary dated Aug. 17, 2015", 3 pgs.
"U.S. Appl. No. 13/953,482, Final Office Action dated Mar. 1, 2018", 20 pages.
"U.S. Appl. No. 13/953,482, Final Office Action dated Mar. 13, 2017", 18 pages.
"U.S. Appl. No. 13/953,482, Final Office Action dated Jul. 25, 2016", 20 pages.
"U.S. Appl. No. 13/953,482, Non Final Office Action dated Apr. 8, 2016", 18 pages.
"U.S. Appl. No. 13/953,482, Non Final Office Action dated Apr. 24, 2015", 16 pgs.
"U.S. Appl. No. 13/953,482, Non Final Office Action dated Nov. 1, 2017", 19 pages.
"U.S. Appl. No. 13/953,482, Non Final Office Action dated Dec. 22, 2016", 17 pages.
"U.S. Appl. No. 13/953,482 , Final Office Action dated Oct. 28, 2015", 16 pgs.
"Int'l Application Serial No. PCT/US2014/047699, Preliminary Report on Patentability dated Feb. 11, 2016", 6 pgs.
"Int'l Application Serial No. PCT/US2014/047699, Search Report and Written Opinion dated Nov. 13, 2014", 8 pgs.
Cheng, Howard et al., "Partial Encryption of Compressed Images and Videos", Retrieved from the Internet on Jan. 9, 2014 <http://citeseerx.ist.psu.edu/viewdoc/download?doi=10.1.1.29.1306&rep=rep1&type=pdf>, 33 pgs.
Shah, Jolly et al., "Video Encryption: A Survey", IJCSI International Journal of Computer Science Issues, vol. 8, Issue 2, ISSN (online): 169-0814, Retrieved from the Internet on Jan. 9, 2014 <http://arxiv.org/ftp/arxiv/papers/1104/1104.0800.pdf>, Mar. 2011, 525-534.
Steffi, A.Anto et al., "Comparative Study of Partial Encryption of Images and Video", International Journal of Modern Engineering Research(IJMER), vol. 1, Issue 1, ISSN: 2249-6645, Sep. 2011, 179-185.
Van Droogenbroeck, Marc et al., "Techniques for a Selective Encryption of Uncompressed and Compressed Images", In Advanced Concepts for Intelligent Vision Systems (ACIVIS), Ghent, Belgiumm, Retrieved from the Internet on Jan. 9, 2014 <http://orbi.ulg.ac.be/bitstream/2268/1496/1/Vandroogenbroeck2002Techniques.pdf>, Sep. 2002, 90-97.

* cited by examiner

EFFICIENT COMMON STORAGE OF PARTIALLY ENCRYPTED CONTENT

CROSS-REFERENCE TO RELATED APPLICATIONS

This application is a continuation of and claims priority to U.S. patent application Ser. No. 13/953,482 "EFFICIENT COMMON STORAGE OF PARTIALLY ENCRYPTED CONTENT," by Torbjörn Einarsson, filed Jul. 29, 2013, which is incorporated by reference herein in its entirety and for all purposes.

TECHNICAL FIELD

The present disclosure relates to the storage and delivery of downloadable media content.

DESCRIPTION OF RELATED ART

In some media systems, a user may download and store a media content item such as a video to view immediately or at a later time. The media content may include one or more files that are stored on the user's computing device. The computing device may be a mobile phone, a desktop computer, a laptop, a tablet computer, a smart television, a digital video recorder, or any other type of computing device.

Media content such as video and audio may be streamed over a network (e.g., via HTTP) in any of various formats. In order to support media content transmission to different types of devices, media systems may be configured to deliver media content in a variety of formats.

One way to accomplish the goal of providing media content in different formats is to reformat the content upon each request. However, if the media content is encrypted, substantial computing resources may be needed to perform the decryption and/or encryption necessary to transform the media content into the appropriate format.

Another way to accomplish the goal of providing media content in different formats is to perform any necessary decryption and encryption in advance and store the media content in more than one format. However, this approach may involve storing potentially many different copies of media content, which may require substantial digital storage space in a digital storage system.

Many types of encryption formats do not support the transformation from one type of content representation to a different content representation. For instance, the MPEG-2 transport stream (TS)-based formats are used by Apple's HTTP Live Streaming (HLS) representation. One HLS format (SAMPLE-AES) is based on encrypting samples partially using AES-128 in CBC mode. In contrast, the Common Encryption Format (CEF) uses AES-128 in CTR mode as default. Transforming from CTR to CBC mode involves decrypting and re-encrypting the content. Thus, under conventional systems, supporting the delivery of content encrypted in either CBC mode or CTR mode involves storing different copies of media content data or performing complex decryption and/or encryption procedures when content is requested.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
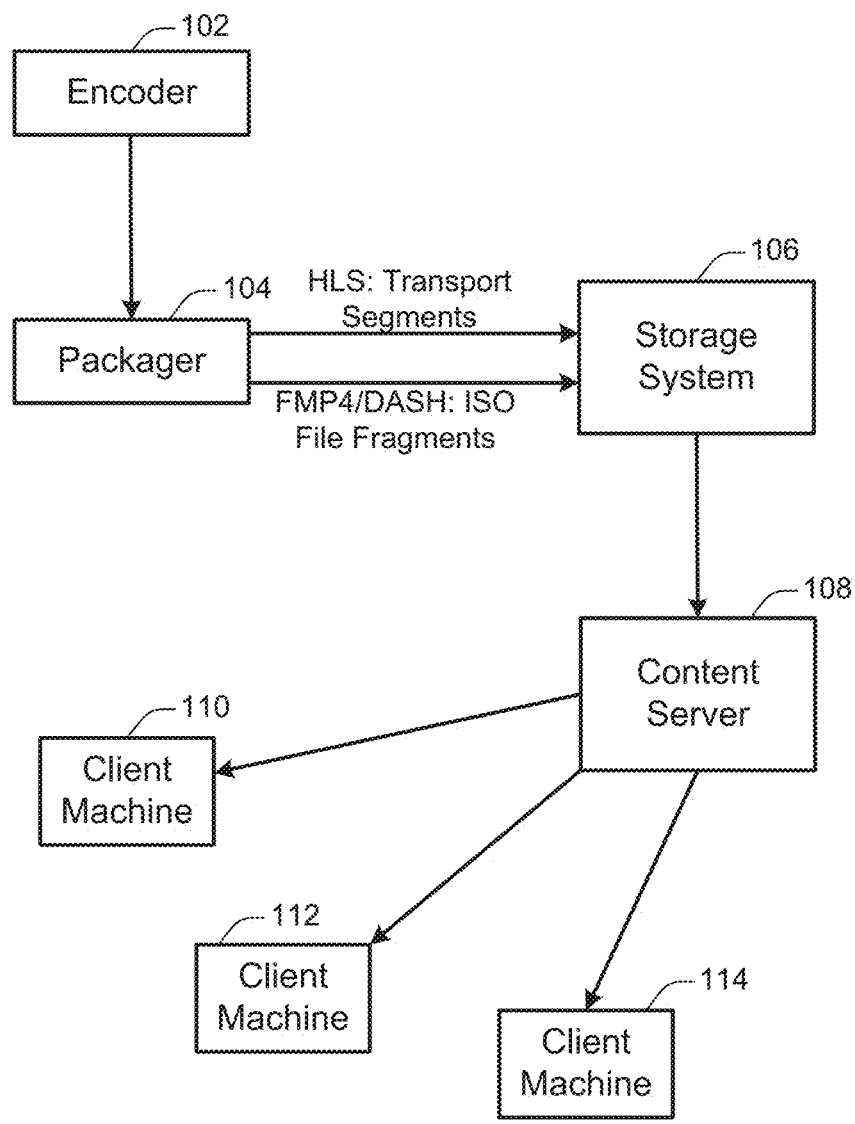
FIG. 1 illustrates an example of a system for providing media content data, configured in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may facilitate the efficient common storage of partially encrypted media content in different media content representations. Media content items such as video and/or audio files may be encrypted to provide digital rights management (DRM) protection. For many media content items, encrypting a subset of the media content data is sufficient to DRM protection. Many representations, such as HLS with sample encryption and CEF, may support encrypting only a subset of the media content data rather than all of the data. In order to provide media content in different formats such as HLS and CEF, a portion of the content may be encrypted in advance in each of the different formats, while the rest of the content may be left unencrypted. For instance, for encrypted media, HLS stores the content as MPEG-TS files with either full or partial samples encrypted with AES. DASH stores files in an ISO file format according to the CEF encryption standard. Then, when a request for a media content item in a particular format is received, the unencrypted content portions may be combined with the encrypted content portions that are encrypted via the format-specific encryption to create the media content item representation for the requested format. In this way, media content may be provided in different formats without performing computationally intensive decryption and/or encryption operations in response to each content request and without storing more than one complete copy of the media content.

EXAMPLE EMBODIMENTS

According to various embodiments, users may receive content from a content management service. The content management service may facilitate the interaction of users with various types of content services. For instance, the content management service may be used to provide content upon request to any number of content playback devices. In order to protect the content from unauthorized usage via DRM, at least a portion of content transmitted to client devices must be encrypted.

According to various embodiments, content may be provided in different types of content representations such as SAMPLE-AES and CEF in order to support the transmission of content to client devices that differ in terms of the hardware, software, and/or data transmission capabilities.

According to various embodiments, a single copy of each of some portions of a media content item may be stored in the media system in an unencrypted state. These unencrypted portions may be used in conjunction with different types of content representations.

According to various embodiments, more than one copy of other portions of the same media content item may be stored in the media system in an encrypted state. Each copy may be encrypted in a format that is specific to one or more media content representations. For instance, a portion of a media content item may be encrypted in one format for SAMPLE-AES and a different format for CEF. Then, different copies of the portion of the media content item that are encrypted in each of these different formats may be stored. When media content is requested in a particular representation, the unencrypted portions of the media content may be combined with the appropriate encrypted portions to construct the requested representation of the media content.

In particular embodiments, the portions of the media content that are encrypted may correspond to a relatively limited percentage of particular sections of the media content. For example, a media system may store video content in CEF format with 10% of key frame bytes encrypted. The rest of the key frame bytes as well as the non-key frame bytes may be left unencrypted. The encrypted key frame byte ranges may be encrypted separately in AES-128 CTR mode as well as in AES-128 CBC mode. Then, the media system may construct HLS video in Sample Encryption mode (SAMPLE-AES) by repackaging the unencrypted video content with the additionally stored CBC-encrypted content. The media system may provide CEF video in a similar fashion.

In particular embodiments, content such as video may be delivered in different formats such as CEF and SAMPLE-AES mode with simple repackaging and no need to decrypt content. At the same time, the storage overhead to the size of the encrypted parts of the video may be reduced relative to conventional systems in which a copy of all of the video content is stored for each supported format. For instance, in particular embodiments the portion of the media content that is encrypted may be approximately 10% of the key frames of a video file, which may correspond to an increase in storage overhead of only 2-3% of the total video bitrate.

Although media content may be referred to herein as video content, the techniques and mechanisms described herein are generally applicable to a wide range of content and content distribution frameworks. For example, the content may be any media content such as video content, audio content, and/or image content.

The storage capacity, write speed, read speed, and other characteristics described herein are included for the purpose of clarity and to provide examples. Computer hardware, software, and networking characteristics change over time. Nevertheless, the techniques described herein are widely applicable to storage systems and frameworks having various hardware, software, and networking characteristics.

FIG. 1 illustrates an example of a system 100 for providing media content data, configured in accordance with one or more embodiments. According to various embodiments, the media system 100 may be used to pre-process video data for storage in a storage system and then use the pre-processed data to provide different representations of a media content item upon request. The media system 100 may provide various media-related services to different client machines and may allow client machines to access various types of media content such as on-demand video.

At 102, an encoder is shown. According to various embodiments, the encoder may receive content in one or more standard formats and then encode it for presentation at a client machine. For instance, the encoder may receive a raw video file composed of raw video data, or a video file in a format other than that intended for transmission to client machines. Then, then encoder may perform one or more operations for transcoding the media content.

According to various embodiments, encoding content data may facilitate the transmission of content data to different types of client machines. For example, raw video data files may be too large to practically send over a network to client machines. In this case, the video data may be transcoded to a lower bitrate for easier transmission to client machines. As another example, different client machines may have different media capabilities, and the video data received by the encoder may be transcoded to facilitate presentation at these different machines.

At 104, a packager is shown. According to various embodiments, the packager may perform operations such as packaging an encoded video for a particular media representation. For instance, the packager may divide a video file into transport segments in accordance with an HLS representation or file fragments in accordance with an FMP4 or DASH representation.

According to various embodiments, the packager may partially encrypt the media content data, which may help to protect the media content data against unauthorized access.

For instance, the packager may identify samples of the media content data to partially encrypt, identify slices of the identified samples to encrypt, and encrypt the identified slices. Examples of the types of operations that may be performed by the processor are discussed in further detail with respect to FIG. 3.

At 106, a storage system is shown. According to various embodiments, the storage system may store the common data as well as the representation-specific data generated by the package 104. For instance, the storage system 106 may store unencrypted header data and unencrypted media content data. The storage system may also store the unencrypted and encrypted portions of partially encrypted media content samples. The information stored in the storage system 106 may be retrieved by the content server 108 upon request in order to provide the media content representations.

At 108, a content server is shown. According to various embodiments, the content server may be configured to provide content upon request to client machines in communication with the media system. The content server may perform operations such as receiving a request for a media content item, constructing the appropriate representation of the media content item, and transmitting the constructed representation to the client machine. Examples of operations that may be performed by the content server are discussed in further detail with respect to FIG. 4.

According to various embodiments, at least some of the content transmitted to client machines may be cached. For instance, if a representation of a media content item is requested by one client machine and is shortly thereafter requested by other client machines, the representation may be constructed once for the first client machine and then stored in cache memory. Then, when subsequent requests are received, the requesting client machines may be sent the cached version without separately constructing the media content representation in response to each request.

Client machines are shown at 110, at 112, and at 114. According to various embodiments, a media system may be in communication with any number of client machines. Client machines may communicate with the media system in order to request and receive content for presentation at the client machines or at other devices in communication with the client machines.

According to various embodiments, a media system may potentially communicate with any of a variety of client machines. For instance, a client machine may be a desktop computer, a laptop computer, a tablet computer, a mobile phone, a conventional or smart television, a cable box, or any other type of device capable of receiving content. It should be noted that the client machines may differ in aspects such as their software configuration, hardware configuration, bandwidth, latency, and other characteristics. Accordingly different client machines may need to be sent different representations of the same content item in order to present it.

Figure 2:
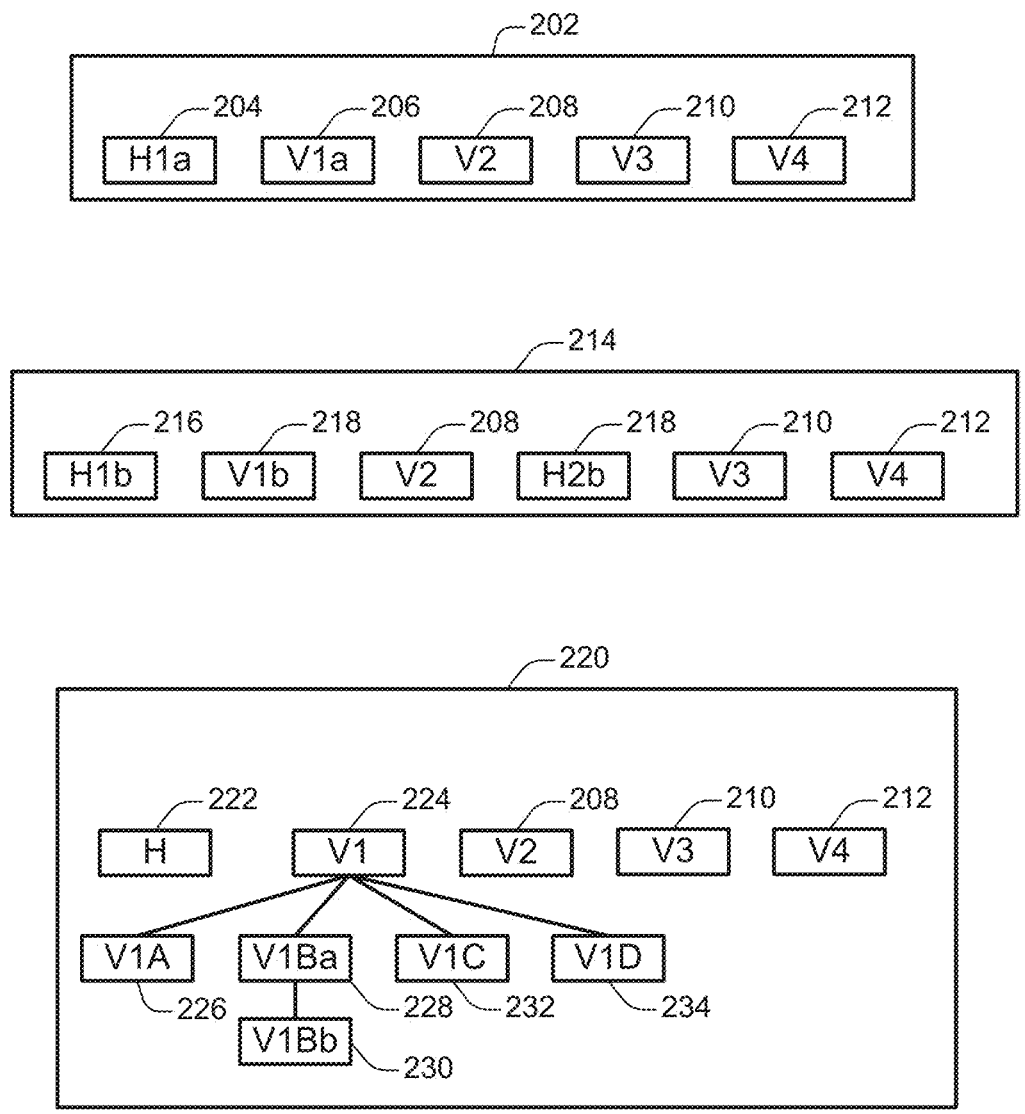
FIG. 2 illustrates an example of an arrangement of media content data.

FIG. 2 illustrates an example of an arrangement of media content data. FIG. 2 includes a section 202 of a first media content representation and a section 214 of a second media content representation. FIG. 2 also includes a section 220 of media content representation data.

According to various embodiments, media content may be represented in different ways. For instance, a video file may be provided in both CEF and SAMPLE-AES representations. More than one representation of a media content item may be provided to support the transmission of media content to client devices that differ in terms of hardware and/or software characteristics. For example, client devices may differ in terms of software such as operating systems and media players. As another example, client devices may include different types of hardware components. As yet another example, client devices may include desktop computers, televisions, mobile phones, tablet computers, laptop computers, smart televisions, cable boxes, or any other configuration of computing hardware.

According to various embodiments, different representations of a media content item may differ in terms of the division of media content samples into sections. Depending on the particular media content representation employed, a section of media content may be referred to in different ways. For instance, in different representations, a media content section may be referred to as a segment or a fragment. Each segment or fragment may include some number of media content samples. For instance, a media content section may include one, two, four, or potentially many different media content samples.

The media content section 214 includes two different sets of headers and video content data, each set of which may be referred to as its own section, segment, or fragment. However, the amount of video content included in the two sections of media content representations 202 and 214 is kept the same for the purpose of clarity.

In particular embodiments, each video content sample may correspond with a video frame. A frame may be a key frame or a non-key frame (also referred to herein as an intermediate frame). Key frames may be used to construct and/or fill in data for intermediate frames. However, the media content data to which the techniques and mechanisms described herein are applied need not be video content data. For instance, the techniques and mechanisms are generally applicable to other types of media content data such as audio data.

According to various embodiments, different representations of a media content item may include media content data that is common to the different representations. For instance, a video file may be provided in both CEF and HLS SAMPLE-AES representations. However, these different representations may include the same video content data. For instance, the sections 202 and 214 of different media content representations shown in FIG. 2 each include the common video content samples 208, 210, and 212.

According to various embodiments, different representations of a media content item may differ in terms of header content associated with each section. The header portion of a section may provide information for a media player to use in accessing the content stored within the section. For instance, the media content section 202 includes the header portion H1a 204 that includes information for accessing the video samples 206, 208, 210, and 212 associated with the header portion H1a 204. The media content section 214 includes the header portion H1b 216 that includes information for accessing the video samples 218 and 208 associated with the header portion H1b 216. The media content section 214 also includes the header portion H1b 218 that includes information for accessing the video samples 210 and 212 associated with the header portion H1b 216.

According to various embodiments, different representations of media content may involve different types of encryption techniques. For example, one type of video content representation may involve the use of AES-128 CTR mode encryption, while a different type of video content representation may involve the use of AES-128 CBC mode encryption. If a media system is to support both types of video content representations, then the same media content encrypted via both types of encryption techniques needs to be made available upon request.

In particular embodiments, a media content item may be protected with DRM-style content protection without encrypting the entire media content item. As long as a sufficient portion of the media content item is encrypted, the media content data may be rendered unusable without the appropriate permissions.

For example, rather than encrypting each frame of a video file, only certain frames may be encrypted. The encrypted frames may include particularly important frames such as key frames. Alternately, or additionally, the encrypted frames may include frames chosen according to different criteria, such as frames chosen at random or frames selected at designated intervals.

As another example, rather than encrypting an entire media sample such as a video frame, only a portion of the sample may be encrypted. For instance, a frame may be divided into slices, and only one or more of the slices may be encrypted. In particular embodiments, slices may be of different sizes. For instance, the first 64 bytes of substantive content in a video frame may be encrypted. Then, the next 512 bytes may be left unencrypted, and the following 64 bytes may be encrypted, with the pattern continuing as necessary.

According to various embodiments, the particular partial encryption scheme used may be strategically determined based on any of various factors, such as the characteristics of the media being encrypted, the computing cost associated with encryption and decryption, and the characteristics of the encryption technique being employed.

In particular embodiments related to video content, each key frame may be partially encrypted. Within each key frame, the first portion of substantive data may be encrypted. In many encoding schemes, the first portion of substantive data within a key frame defines the structure of the frame. Thus, without this important data, the key frame cannot be reconstructed. Similarly, without constructing the key frame, the intermediate frames between key frames cannot be reconstructed. Thus, by partially encrypting an important slice of an important frame, an entire section of media content data may be encrypted. However, different encryption schemes may be applied to different types of media content representations.

According to various embodiments, the section of media content representation data 220 shown in FIG. 2 may be used to provide the two different media content representations 202 and 214. The media content representation data 220 includes the header data portion 222 and the media content data samples 224, 208, 210, and 212.

According to various embodiments, the header data portion 222 may be used to construct the header portions 204 and 216 for the different media content representations. In particular embodiments, the header data portion 222 may corresponding exactly or almost exactly to one of the header portions 204 and 216. Then, the header data portion 222 may be quickly transformed upon request to the other header portion. Alternately, the header data portion 222 may serve as input data used to construct both of the header portions 204 and 216 upon request.

According to various embodiments, the media content samples 208, 210, and 212 may include media content data used to present the section of media content. For instance, each media content sample may correspond to a video frame or an audio sample. As shown in FIG. 2, at least some of the media content samples may be the same across different media content item representations. When a representation is selected, the appropriate common media content samples may be selected to provide the requested representation.

The media content data sample 224 is partially encrypted. The media content data sample 224 is divided into different components V1A 226, V1B, V1C 232, and V1D 234. For instance, a video sample such as a frame may be divided into different slices. Each slice may correspond with a subset of the data that makes up the media content data sample.

According to various embodiments, one or more components of a partially encrypted data sample may be stored in an unencrypted state. For instance, the data sample components V1A 226, V1C 232, and V1D 234 are stored in an unencrypted state. These data sample components are common to the different media content representations.

According to various embodiments, one or more components of a partially encrypted data sample may be stored in an encrypted state. For instance, the data sample component V1B is stored separately in the encrypted state V1B1 228 and the encrypted state V1B2 230. These different encrypted states each correspond with one of the media content representations.

According to various embodiments, when a media content item representation is requested, unencrypted data may be combined with representation-specific encrypted data to provide a partially encrypted data sample. This partially encrypted data sample may be combined with headers and unencrypted data to construct a representations-specific media content section. Potentially many different media content sections may be constructed in this way to provide a completed media content item representation. Techniques for providing media content representations in this way are discussed in further detail with respect to FIGS. 3 and 4.

Although FIG. 2 shows only a limited section of each media content representation, many media content items includes many different sections of media content. For instance, a video file for a movie may include many thousands of key frames.

Further, although FIG. 2 shows an arrangement of media content data that may be used in conjunction with two different media content representations, a media system may support potentially many different media content representations. When more media content representations are supported, media slide data portions may be stored for the media sample slice V1B in addition to the media sample slice data portions 228 and 230.

In this way, different representations of the same media content item may be provided upon request. In particular embodiments, different representations of the media content item may be provided without performing encryption or decryption of the media content. At the same time, the different representations may be provided without storing more than one copy of all of the media content data associated with the media content item. Thus, techniques and mechanisms described herein may help relieve the tension between processor usage and storage usage when providing different representations of the same media content item.

Figure 3:
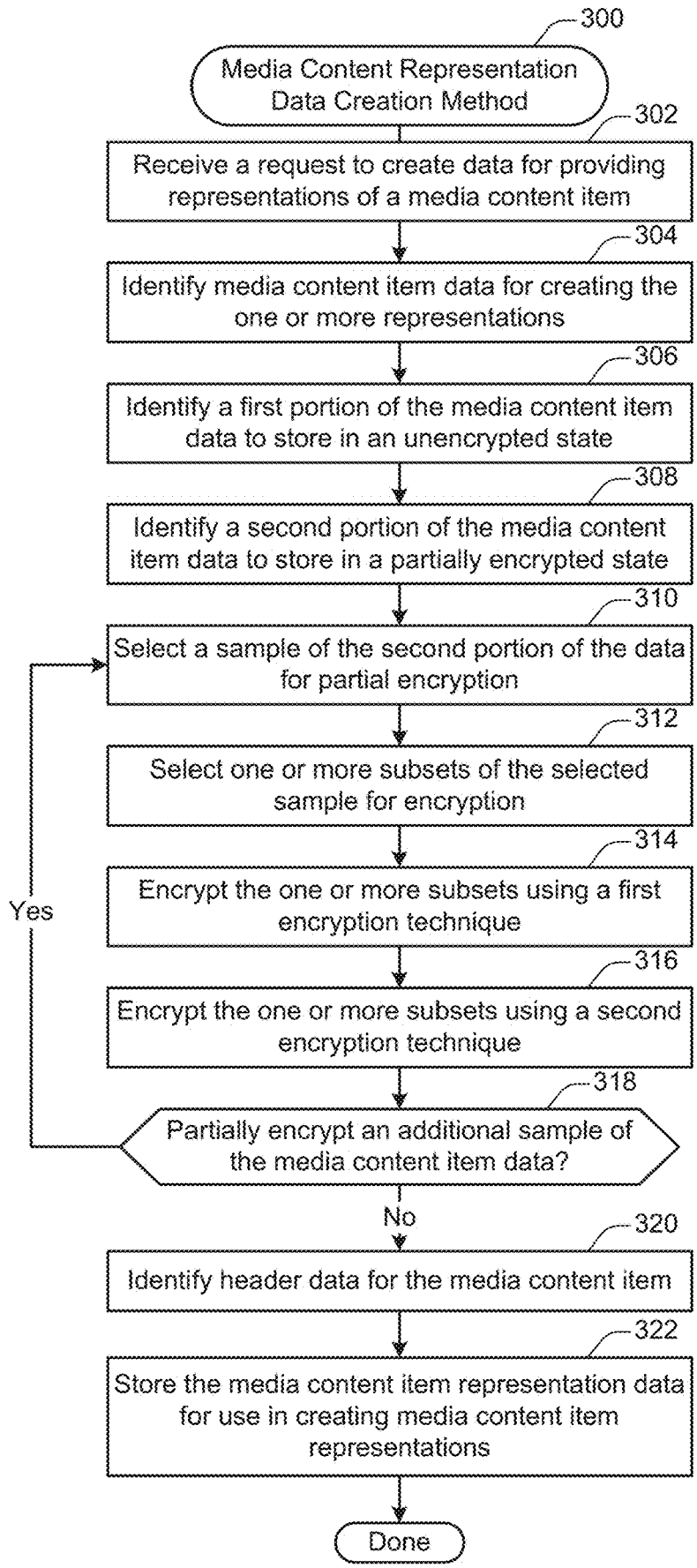
FIG. 3 illustrates a method for creating media content representation data, performed in accordance with one or more embodiments.

FIG. 3 illustrates a method 300 for creating media content representation data, performed in accordance with one or more embodiments. According to various embodiments, the method 300 may be used to create, organize, and store the information needed to provide different representations of a media content item upon request. For instance, the method 300 may be used to create the section 220 of media content representation data shown in FIG. 2.

At 302, a request to create data for providing representations of a media content item is received. According to various embodiments, the request may be received when an item of media content is received by the media system for the purpose of providing to client devices requesting the media content. Alternately, or additionally, the request may be received when media content is designated for re-encoding, for instance at a different bitrate or file size.

At 304, media content item data for creating the one or more representations of the media content is identified. According to various embodiments, the media content item data may be any information used to construct a representation of the media content item. For example, the media content item data may include media content data such as video or audio samples. This media content data may be used by a media player to present the media for playback. As another example, the media content item data may include header data. The header data may act as a type of metadata that provides instructions to the media player regarding how to interpret the media content data.

At 306, a first portion of the media content item data is identified for storing in an unencrypted state. According to various embodiments, only a portion of a media content item need be encrypted in order to protect the media content item with DRM-style content protection. Then, the remainder of the content data that is stored in an unencrypted state may be shared across different media content representations.

The data selected for storing in an unencrypted state may include any information that is not selected for complete or partial encryption. In particular embodiments, relatively less important data may be selected for storing in an unencrypted state. For example, in video content, non-key frames may be stored in an unencrypted state. As another example, data to be stored in an unencrypted state may be selected based on data compression techniques employed. For instance, when using Lempel-Ziv-Welch (LZW) data compression, a dictionary table may be used to describe compressed data. In such schemes, the dictionary table may be encrypted while the compressed data itself may be stored in an unencrypted state.

At 308, a second portion of the media content item data is identified for storing in a partially encrypted state. According to various embodiments, the second portion of the media content item data may be identified by selecting any portions of the media content data that, if encrypted would help to prevent reconstruction of the unencrypted media content item. For example, portions of media content item data to encrypt may be selected at random or at regular intervals. As another example, relatively important portions of media content items such as key frames in video content data may be selected.

At 310, a sample of the section portion of the data is selected for partial encryption. According to various embodiments, each sample included in the second portion of the data identified at operation 308 may be separately and partially encrypted via different encryption techniques. For instance, the samples may be selected sequentially or in any other ordering.

At 312, one or more subsets of the selected sample are selected for encryption. According to various embodiments, a sample may be a portion of data such as a video frame. The sample may be divided into different subsets. For instance, video frame data may be divided into slices. Then, some of the subsets may be encrypted while others are not. In this way, the video content may be protected while encrypting only a subset of each of selected samples of the video content.

According to various embodiments, the selection of sample subsets for encryption may be strategically performed based on the type of data included in the sample. For instance, in some video frames, the first slice of data includes configuration data, the second slice of data includes structural and relational data, and the remaining slices of data include content data with which the configuration data and structural data may be combined to generate the complete frame. In this arrangement, encryption of only the second slice of data may provide a relatively high level of content protection at a relatively low cost of encryption. However, in different arrangements of data, different arrangements of slices and different selections of one or more subsets for encryption may be used.

At 314, the one or more subsets are encrypted using a first encryption technique. At 316, the one or more subsets are encrypted using a second encryption technique. According to various embodiments, the different encryption techniques may correspond to different media content representations. For instance, one encryption technique may be AES-128 in CTR mode, while the other encryption technique may be AES-128 in CBC mode. However, a variety of encryption techniques may be used.

In particular embodiments, the particular encryption techniques used may be strategically determined based on the types of media content representations offered by the media system. Further, more than two different encryption techniques may be applied. For instance, a media system may offer a media content item according to one, two, or any number of different representations.

At 318, a determination is made as to whether to partially encrypt an additional sample of the media content item data. As discussed with respect to operations 306-310, only some samples of a media content item need be selected for encryption in order to protect the content. The determination made at operation 316 may involve determining whether each sample identified for partial encryption has been partially encrypted at operation 310.

At 320, header data for the media content item is identified. According to various embodiments, the header data may be used for providing header data portions for media segments in the media content representations. An example of header data is discussed with respect to the header data 222 shown in FIG. 2.

According to various embodiments, the header data may be configured in any of various ways. For example, the header data for a particular media content section may correspond to the header portion of a section for a particular media content representation. When a different media content representation is selected, the header data may be transformed to create the header portion or portions for the different media content representation. As another example, the header data for a particular media content section may be stored in a base state that may then be used to dynamically generate each media content representation that is requested.

At 322, the media content item representation data is stored for use in creating media content item representations. According to various embodiments, the media content item representation data may be stored in a storage system for retrieval by a content server. For instance, the media content item representation data may be stored in the storage system 106 discussed with respect to FIG. 1. The operations of one example of a content server are discussed with respect to the content server 108 shown in FIG. 1.

Figure 4:
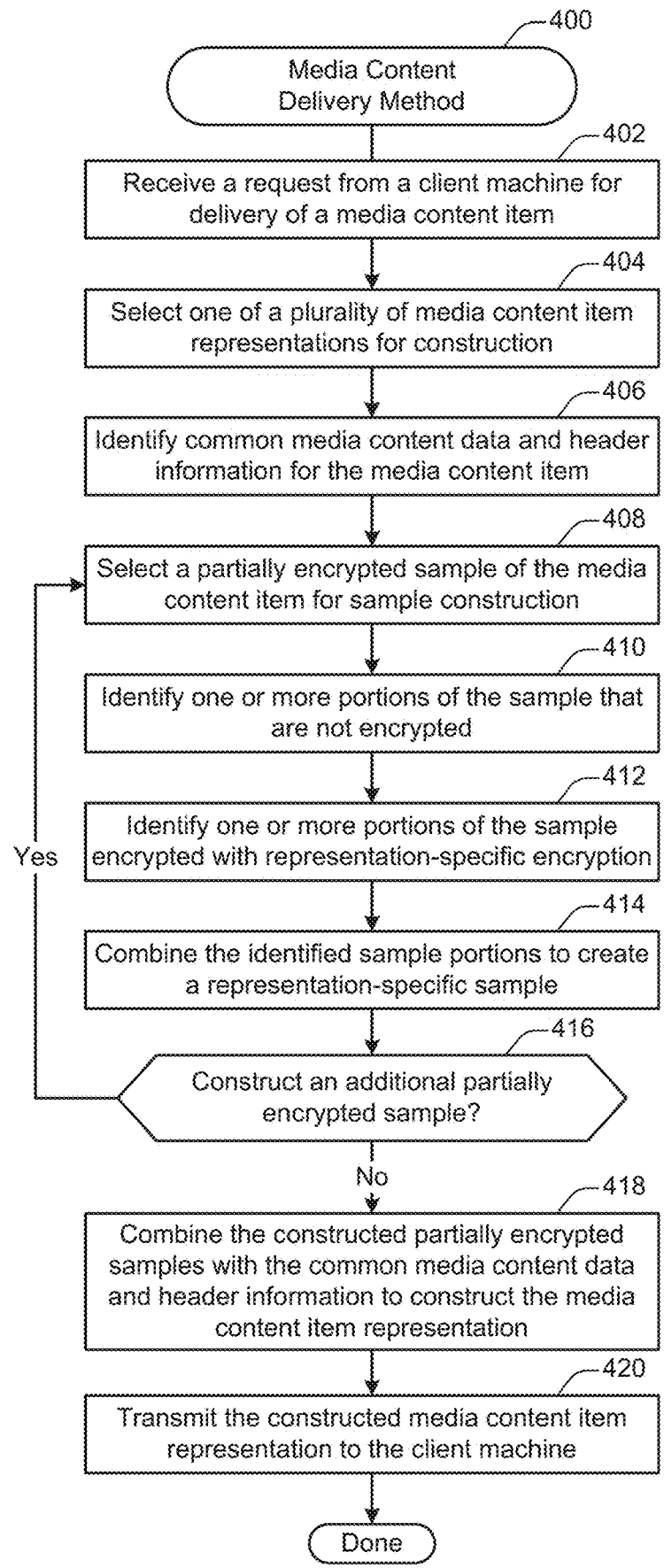
FIG. 4 illustrates a method for delivering media content to a client machine.
Figure 5:
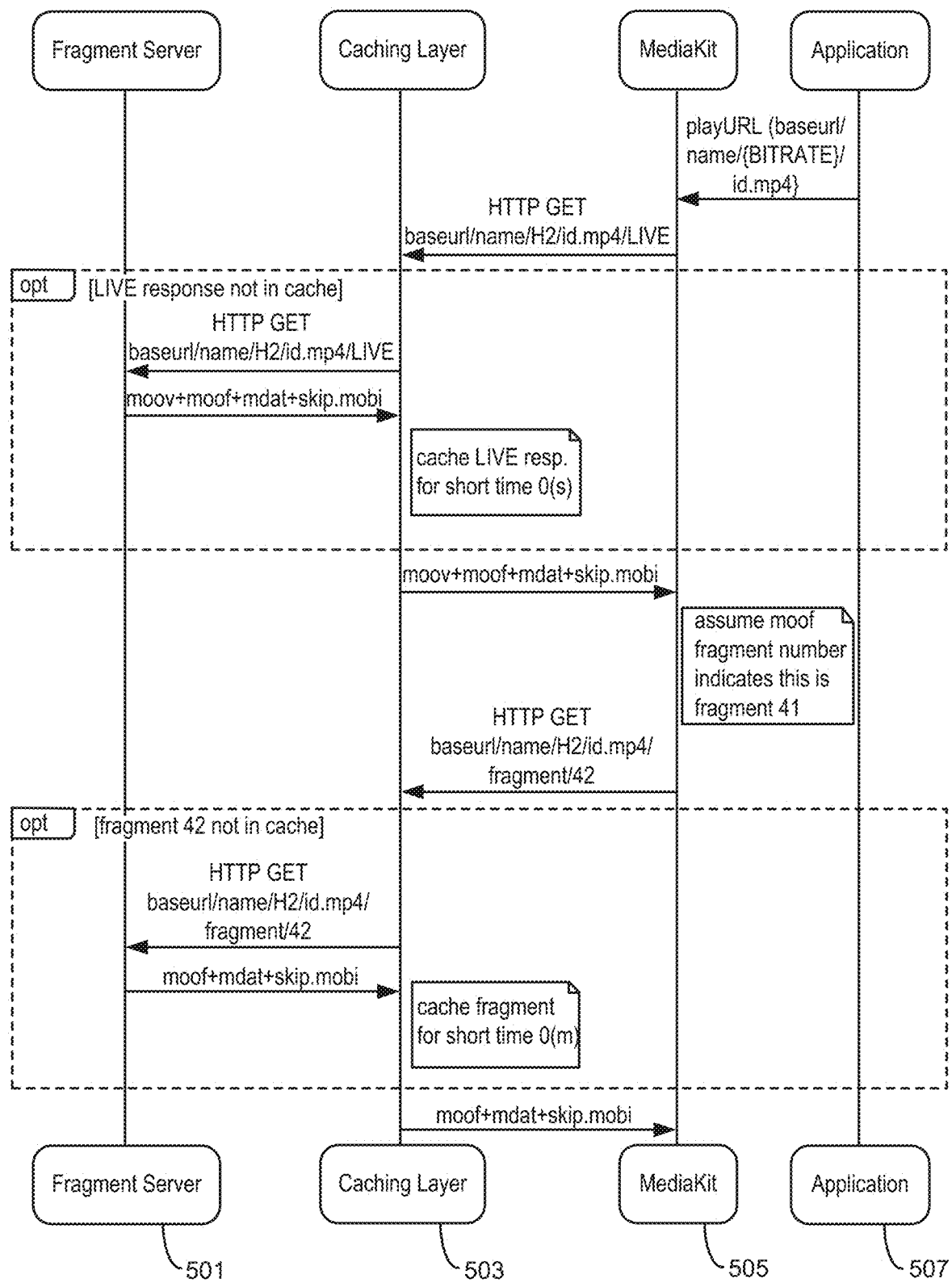
FIG. 5 illustrates one example of an exchange used with a media delivery system.

FIG. 4 illustrates a method 400 for delivering media content to a client machine, performed in accordance with one or more embodiments. According to various embodiments, the method 400 may be performed at a media content server configured to provide media content upon request.

The media content server may be associated with a media content system configured to provide any of a variety of media-related services to client machines. For instance, client devices such as computers, mobile phones, and/or cable boxes may communicate with the media content system to receive media content or information related to media content for presenting at the client devices.

According to various embodiments, the method 400 may be performed at a server in communication with a storage system. For instance, the method 400 may be performed at the content server 108 shown in FIG. 1. In FIG. 1, the content server 108 is in communication with the storage system 106.

At 402, a request is received from a client machine for delivery of a media content item. According to various embodiments, the request may be transmitted to the server via a network such as the Internet, a cellular network, or a cable network. The request may identify a particular media content item such as a movie, a television show, a song, or any other media content item capable of being transmitted by the server that receives the request. The media content item requested may be transmitted live or on demand.

At 404, one of a plurality of media content item representations is selected for construction. According to various embodiments, a media content item may be represented in different ways for purposes such as supporting different hardware, software, and/or data transmission capabilities for various devices. For example, a personal computer, a mobile phone, and a cable box may be configured to play different types of audio and/or video files.

In particular embodiments, the representation of the media content item may be selected based on any of a variety of considerations. For example, the request received at operation 402 may be received from a device known to the server to have a particular set of hardware, software, and/or network transmission capabilities. As another example, the request received at operation 402 may specify a particular type of set of types of media content item representation to provide in response to the request.

At 406, common media content data and header information for the media content item is identified. According to various embodiments, the common media content data and header information is data that may be used in conjunction with more than one type of media content item representation. For example, different media content item representations may include identical or nearly identical media content data. As another example, header information may in at least some instances be readily transformed between different media content item representations without performing expensive calculations such as decryption and encryption. As yet another example, header information may be stored in a format that is not specific to any particular representation and may be readily processed to create headers that are specific to a particular media content item representation.

At 408, a partially encrypted sample of the media content item is selected for sample construction. According to various embodiments, a sample such as a video frame may be divided into different portions, some of which are encrypted and some of which are not. The partially encrypted sample of the media content item may be created as discussed with respect to FIG. 3. The partially encrypted samples may be selected for construction in chronological order within the media content or in any other order.

At 410, one or more portions of the sample that are not encrypted are identified. At 412, one or more portions of the sample that are encrypted with representation-specific encryption are identified. According to various embodiments, the unencrypted and encrypted portions of the sample may be created as discussed with respect to the operations 308-316 shown in FIG. 3. These portions may correspond with slices of a video frame.

At 414, the identified sample portions are combined to create a representation-specific sample. As discussed with respect to FIGS. 1 and 2, a sample may include interleaved encrypted and unencrypted portions. The encrypted portions may be specific to the representation, while the unencrypted portions may be common to more than one representation. Combining the sample portions identified at operations 410 and 412 may be performed by interleaving the portions in a way that reflects the manner in which they were created as discussed with respect to FIG. 3 and is shown in FIGS. 1 and 2. Instructions for combining the sample portions may be stored along with the portions themselves that are created as discussed with respect to FIG. 3.

At 416, a determination is made as to whether to construct an additional partially encrypted sample. According to various embodiments, a media content item may include potentially many different partially encrypted samples. For example, in some instances each sample within the media content item may be partially encrypted. As another example, in some instances only particularly important samples such as key frames within video content may be partially encrypted. As yet another example, in some combinations some combination of samples such as samples selected at random or regular interfaces may be partially encrypted. Accordingly, the determination made at operation 416 may be made at least in part by determining which samples associated with the media content item were partially encrypted as discussed with respect to FIGS. 1-3.

At 418, the constructed partially encrypted samples are combined with the common media content data to construct the media content item representation. As discussed with respect to FIGS. 1 and 2, various types of media content item representations may be employed. Accordingly, the specific operations performed at operation 418 may depend on the particular media content representation being constructed.

According to various embodiments, constructing the media content item representation may include various types of operations. For example, the video data including common data and/or constructed partially encrypted samples may be divided or segmented in a manner specific to the particular media content item representation selected at operation 404. As another example, the header information identified in operation 406 may be modified or transformed to create headers that are appropriate for the selected representation. As yet another example, header information, common media content data, and constructed partially encrypted samples may be interleaved in a manner appropriate for the selected representation.

At 420, the constructed media content item representation is transmitted to the client machine. According to various embodiments, the constructed media content item representation may be transmitted via a network such as the Internet, a cable television network, or a cellular network. In particular embodiments, all or portions of the media content item representation may be stored in a cache so that some or all of the media content item representation may be transmitted to client machines upon request without separately constructing the representation for each request. For instance, a media content item presented in a live media context may be separately requested by potentially many different client devices at the same time.

Figure 7:
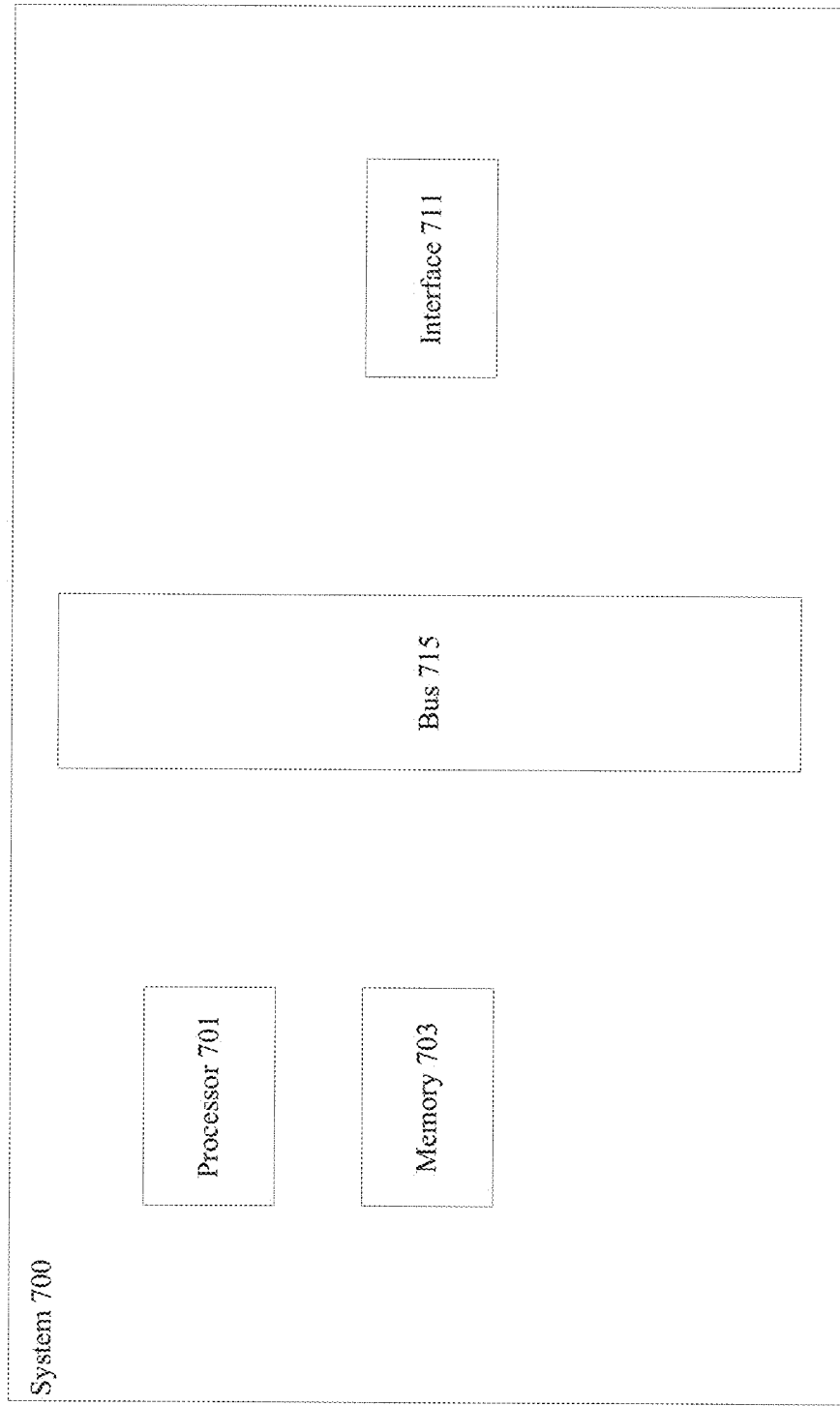
FIG. 7 illustrates an example of a system.

FIG. 7 illustrates an interaction for a client receiving a media stream such as a live stream. The client starts playback when fragment 41 plays out from the server. The client uses the fragment number so that it can request the appropriate subsequent file fragment. An application such as a player application 507 sends a request to mediakit 505. The request may include a base address and bitrate. The mediakit 505 sends an HTTP get request to caching layer 503. According to various embodiments, the live response is not in cache, and the caching layer 503 forwards the HTTP get request to a fragment server 501. The fragment server 501 performs processing and sends the appropriate fragment to the caching layer 503 which forwards to the data to mediakit 505.

The fragment may be cached for a short period of time at caching layer 503. The mediakit 505 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 505 may request a next fragment having a different data rate. In some instances, the mediakit 505 may request a next fragment having a higher data rate. According to various embodiments, the fragment server 501 maintains fragments for different quality of service streams with timing synchronization information to allow for timing accurate playback.

The mediakit 505 requests a next fragment using information from the received fragment. According to various embodiments, the next fragment for the media stream may be maintained on a different server, may have a different bitrate, or may require different authorization. Caching layer 503 determines that the next fragment is not in cache and forwards the request to fragment server 501. The fragment server 501 sends the fragment to caching layer 503 and the fragment is cached for a short period of time. The fragment is then sent to mediakit 505.

Figure 6:
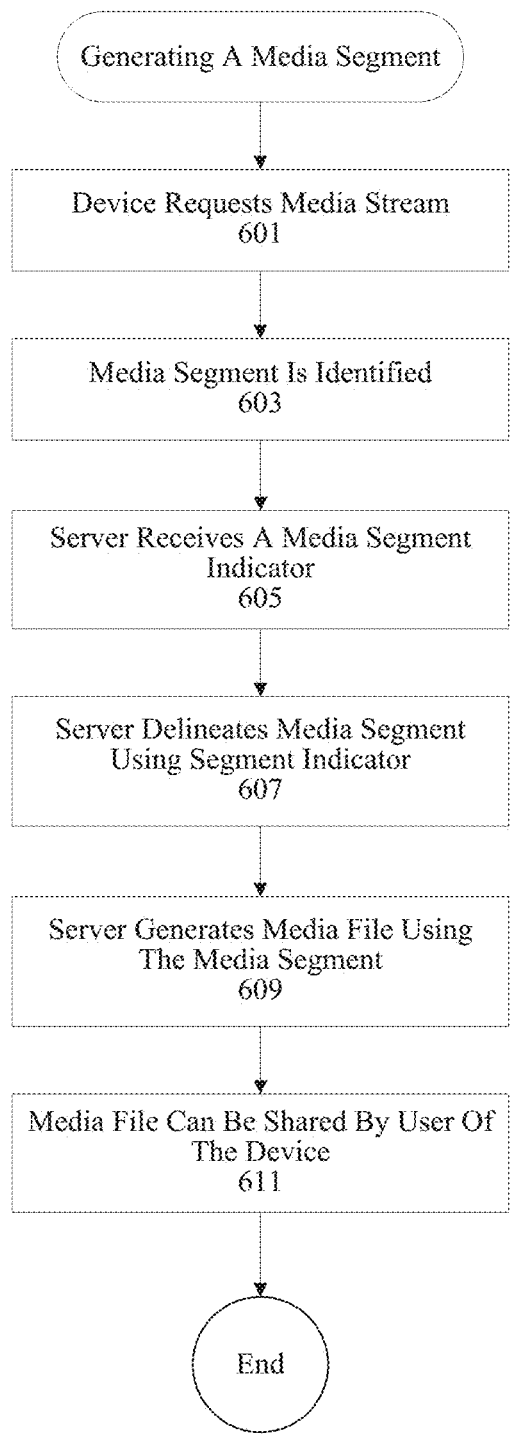
FIG. 6 illustrates one technique for generating a media segment.

FIG. 6 illustrates a particular example of a technique for generating a media segment. According to various embodiments, a media stream is requested by a device at 601. The media stream may be a live stream, media clip, media file, etc. The request for the media stream may be an HTTP GET request with a baseurl, bitrate, and file name. At 603, the media segment is identified. According to various embodiments, the media segment may be a 35 second sequence from an hour long live media stream. The media segment may be identified using time indicators such as a start time and end time indicator. Alternatively, certain sequences may include tags such as fight scene, car chase, love scene, monologue, etc., that the user may select in order to identify a media segment. In still other examples, the media stream may include markers that the user can select. At 605, a server receives a media segment indicator such as one or more time indicators, tags, or markers. In particular embodiments, the server is a snapshot server, content server, and/or fragment server. According to various embodiments, the server delineates the media segment maintained in cache using the segment indicator at 607. The media stream may only be available in a channel buffer. At 609, the server generates a media file using the media segment maintained in cache. The media file can then be shared by a user of the device at 611. In some examples, the media file itself is shared while in other examples, a link to the media file is shared.

FIG. 7 illustrates one example of a server. According to particular embodiments, a system 700 suitable for implementing particular embodiments of the present invention includes a processor 701, a memory 703, an interface 711, and a bus 715 (e.g., a PCI bus or other interconnection fabric) and operates as a streaming server. When acting under the control of appropriate software or firmware, the processor 701 is responsible for modifying and transmitting live media data to a client. Various specially configured devices can also be used in place of a processor 701 or in addition to processor 701. The interface 711 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 700 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
storing a media content item at a media server, the media content including a first media content data, a second media content data, the first media content data comprising one or more non-key frames, the second media content data comprising one or more key frames, wherein storing the media content item includes:
storing only a single copy of the first media content data as unencrypted data, storing multiple copies of the second media content data as encrypted data, each copy of the multiple copies of the second media content data being a different designated streaming format, and storing a header in a format that is not specific to any designated streaming format;

receiving at the media server a request from a client device to transmit the media content item via a communications interface, the media content item comprising video data, the media content item being associated with a plurality of streaming formats;

constructing at the media server the requested media content item in a designated streaming format by creating a particular media content item representation, via a processor at the media server, the particular media content item representation created by transforming the stored header that is not specific to any designated streaming format into a format specific to the designated streaming format, and combining the stored one or more non-key frames of the first media content data, the stored one or more key frames of second media content data, and the transformed header;

transmitting the particular media content item representation to the client device via the communications interface for playback; and storing the constructed requested media content item in cache such that the constructed requested media content item may be transmitted to another client device upon request without separately constructing the representation for each request.

2. The method recited in claim 1, wherein the particular media content item representation comprises a video content frame.

3. The method recited in claim 1, wherein the particular media content item representation is specific to the designated streaming format.

4. The method recited in claim 1, wherein the designated streaming format includes a plurality of unencrypted media content portions, each of the unencrypted media content portions being common to the plurality of streaming formats.

5. The method recited in claim 1, wherein the designated streaming format includes a plurality of header portions, each of the plurality of header portions being specific to the designated streaming format.

6. The method recited in claim 5, wherein each of the plurality of header portions is created in response to receiving the request, and wherein each of the plurality of header portions is created based on header data common to the plurality of streaming formats.

7. The method recited in claim 1, wherein the designated streaming format is selected from the plurality of streaming formats based on a hardware or software capability of the client device.

8. A system comprising:
a processor; and
memory, the memory storing instructions to execute a method, the method comprising:
storing a media content item at a media server, the media content including a first media content data, a second media content data, the first media content data comprising one or more non-key frames, the second media content data comprising one or more key frames, wherein storing the media content item includes:
storing only a single copy of the first media content data as unencrypted data,
storing multiple copies of the second media content data as encrypted data, each copy of the multiple copies of the second media content data being a different designated streaming format, and
storing a header in a format that is not specific to any designated streaming format;

receiving at the media server a request from a client device to transmit the media content item via a communications interface, the media content item comprising video data, the media content item being associated with a plurality of streaming formats;

constructing at the media server the requested media content item in a designated streaming format by creating a particular media content item representation, via a processor at the media server, the particular media content item representation created by transforming the stored header that is not specific to any designated streaming format into a format specific to the designated streaming format, and combining the stored one or more non-key frames of the first media content data, the stored one or more key frames of second media content data, and the transformed header;

transmitting the particular media content item representation to the client device via the communications interface for playback; and storing the constructed requested media content item in cache such that the constructed requested media content item may be transmitted to another client device upon request without separately constructing the representation for each request.

9. The system recited in claim 8, wherein the particular media content item representation comprises a video content frame.

10. The system recited in claim 8, wherein the particular media content item representation is specific to the designated streaming format.

11. The system recited in claim 8, wherein the designated streaming format includes a plurality of unencrypted media content portions, each of the unencrypted media content portions being common to the plurality of streaming formats.

12. The system recited in claim 8, wherein the designated streaming format includes a plurality of header portions, each of the plurality of header portions being specific to the designated streaming format.

13. The system recited in claim 12, wherein each of the plurality of header portions is created in response to receiving the request, and wherein each of the plurality of header portions is created based on header data common to the plurality of streaming formats.

14. The system recited in claim 8, wherein the designated streaming format is selected from the plurality of streaming formats based on a hardware or software capability of the client device.

15. One or more non-transitory computer readable medium having instructions stored thereon for performing a method, the method comprising:
storing a media content item at a media server, the media content including a first media content data, a second media content data, the first media content data comprising one or more non-key frames, the second media content data comprising one or more key frames, wherein storing the media content item includes:
storing only a single copy of the first media content data as unencrypted data, storing multiple copies of the second media content data as encrypted data, each copy of the multiple copies of the second media content data being a different designated streaming format, and storing a header in a format that is not specific to any designated streaming format;

receiving at the media server a request from a client device to transmit the media content item via a communications interface, the media content item comprising video data, the media content item being associated with a plurality of streaming formats;

constructing at the media server the requested media content item in a designated streaming format by creating a particular media content item representation, via a processor at the media server, the particular media content item representation created by transforming the stored header that is not specific to any designated streaming format into a format specific to the designated streaming format, and combining the stored one or more non-key frames of the first media content data, the stored one or more key frames of second media content data, and the transformed header;

transmitting the particular media content item representation to the client device via the communications interface for playback; and storing the constructed requested media content item in cache such that the constructed requested media content item may be transmitted to another client device upon request without separately constructing the representation for each request.

16. The non-transitory computer readable medium recited in claim 15, wherein the particular media content item representation comprises a video content frame.

17. The non-transitory computer readable medium recited in claim 15, wherein the particular media content item representation is specific to the designated streaming format.

18. The non-transitory computer readable medium recited in claim 15, wherein the designated streaming format includes a plurality of unencrypted media content portions, each of the unencrypted media content portions being common to the plurality of streaming formats.

19. The non-transitory computer readable medium recited in claim 15, wherein the designated streaming format includes a plurality of header portions, each of the plurality of header portions being specific to the designated streaming format.

20. The non-transitory computer readable medium recited in claim 19, wherein each of the plurality of header portions is created in response to receiving the request, and wherein each of the plurality of header portions is created based on header data common to the plurality of streaming formats.

* * * * *